UNITED STATES PATENT OFFICE.

ALEXANDER MACOMB CHANCE AND JAMES FREDERICK CHANCE, OF OLDBURY, COUNTY OF WORCESTER, ENGLAND.

OBTAINING HYDROGEN SULPHIDE FROM ALKALI WASTE.

SPECIFICATION forming part of Letters Patent No. 403,249, dated May 14, 1889.

Application filed December 14, 1888. Serial No. 293,586. (No specimens.) Patented in England June 16, 1887, No. 8,666; in France September 6, 1887, No. 185,677, and in Belgium September 7, 1887, No. 78,799.

*To all whom it may concern:*

Be it known that we, ALEXANDER MACOMB CHANCE and JAMES FREDERICK CHANCE, of Oldbury, in the county of Worcester, England, have invented a new and useful Improvement in Obtaining Sulphureted Hydrogen from Alkali Waste; and we do hereby declare the following to be a full, clear, and exact description thereof.

It is well known that a mixture of alkali waste and water may be completely decomposed with production of carbonate of lime and sulphureted hydrogen by passing through it, preferably in a series of vessels, gases containing carbonic acid—such as those evolved from a closed limekiln; but the sulphureted hydrogen produced is diluted by such large and varying quantities of other gases that it cannot easily be turned to account.

By the present invention the sulphureted hydrogen obtained is accompanied by a much smaller and very constant quantity of other gases, so that it may be burned directly in air for the manufacture of sulphurous and sulphuric acids, or be profitably treated for the production of sulphur or for other purposes.

In carrying our invention into effect we introduce the mixture of alkali waste and water, preferably as a thin cream, into a series of vessels connected by pipes and furnished with inlet and outlet ways, and we pump or pass through some or all of such vessels gases containing carbonic acid. The apparatus is preferably that for which we have applied for United States Letters Patent simultaneously with this; but other suitable apparatus may be used. We prefer to use the gases evolved from a closed limekiln, consisting almost entirely of carbonic acid and nitrogen. When these gases, entering the first vessel, come into contact with the mixture of alkali waste and water, not only is the carbonic acid absorbed by the sulphide of lime with production in the presence of water of carbonate of lime and sulphureted hydrogen; but also this latter, being driven forward through the series of vessels and meeting with fresh quantities of sulphide of lime, is by it absorbed with production of sulphydrate of lime, so that at first the gases issuing from the last vessel contain neither carbonic acid nor sulphureted hydrogen or merely traces thereof, and may be allowed to escape into the atmosphere, passing, however, as a precautionary measure, when desired, through milk of lime contained in a subsidiary vessel, or through purifiers containing oxide of iron or lime. If free lime be present in the waste, some of the carbonic acid will be absorbed by it with production of carbonate of lime, and also some of the sulphureted hydrogen driven forward will be absorbed by it with production of sulphydrate of lime. When after a time the issuing gases begin to contain sulphureted hydrogen in appreciable quantity, we close the outlet from the last vessel and open that from some one of the intermediate vessels, where we find that the issuing gases contain a large proportion of sulphureted hydrogen in consequence of the fact that the carbonic acid is now acting upon the sulphydrate of lime formed as aforesaid, and that for each equivalent of carbonic acid absorbed two equivalents of sulphureted hydrogen are being evolved. We therefore conduct away separately these gases so long as they contain sulphureted hydrogen in sufficient quantity, preferably to a gas-holder, and apply them to any of the above-mentioned purposes. When the quantity of sulphureted hydrogen becomes too small, we close this outlet, and having emptied the first vessel or vessels in which the decomposition of the alkali waste has been completed and filled another or others later in the series with a fresh mixture of alkali waste and water, we resume our operations as at first, and so proceed continuously.

Before treating the waste as above described we prefer to separate the coarser portions of it by passing the mixture of waste and water through a sieve or grating, or by any other convenient means, and we may crush these coarser portions, if desired, and treat them similarly to the rest of the waste; or the whole of the waste may be treated so as to crush the coarser portions of it before it is treated with the gases containing carbonic acid in the series of vessels.

The mud consisting, mainly, of carbonate of lime resulting from the decomposition of the alkali waste may be used in the black-ash furnaces in the place of limestone, or for making cement or for other purposes.

We claim—

1. The process of obtaining sulphureted hydrogen from alkali waste by decomposing such waste with gases containing carbonic acid, passing the resultant gases containing sulphureted hydrogen in contact with fresh alkali waste, so that the said sulphureted hydrogen unites therewith, and afterward decomposing with gases containing carbonic acid the composition or product formed by the union of the sulphureted hydrogen and alkali waste and collecting apart the rich gases from such decomposition, substantially as described.

2. The process of obtaining sulphureted hydrogen from alkali waste by passing gases containing carbonic acid through a mixture of alkali waste and water in a series of vessels, afterward, when the sulphureted hydrogen from the waste in the first vessel or vessels of the series has been transferred to the waste in succeeding vessels, drawing off apart the gases rich in sulphureted hydrogen from an intermediate vessel in the series, and when these gases have become poor in that material conducting the gases containing carbonic acid through the waste and water in the intermediate and succeeding vessels of the said series and fresh waste and water in an additional vessel or vessels, thus constituting a new series, with which the operations are repeated, substantially as described.

ALEXANDER MACOMB CHANCE.
JAMES FREDERICK CHANCE.

Witnesses:
J. R. HOLLIDAY,
W. H. HARRIS.